P. W. HEBEBRAND.
RECEIVING CABINET.
APPLICATION FILED JAN. 12, 1910.

963,148.

Patented July 5, 1910.

ATTEST
E. M. Fisher
J. C. Mussun

INVENTOR
PETER W. HEBEBRAND.
BY Fisher & Moser ATTYS.

UNITED STATES PATENT OFFICE.

PETER W. HEBEBRAND, OF CLEVELAND, OHIO.

RECEIVING-CABINET.

963,148.  Specification of Letters Patent.  Patented July 5, 1910.

Application filed January 12, 1910. Serial No. 537,780.

*To all whom it may concern:*

Be it known that I, PETER W. HEBEBRAND, a citizen of the United States, residing at Cleveland, in the county of Cuyahoga and State of Ohio, have invented certain new and useful Improvements in Receiving-Cabinets, of which the following is a specification.

My invention relates to a receiving cabinet for milk and other liquids, all substantially as shown and described and particularly pointed out in the claim.

Figure 1:
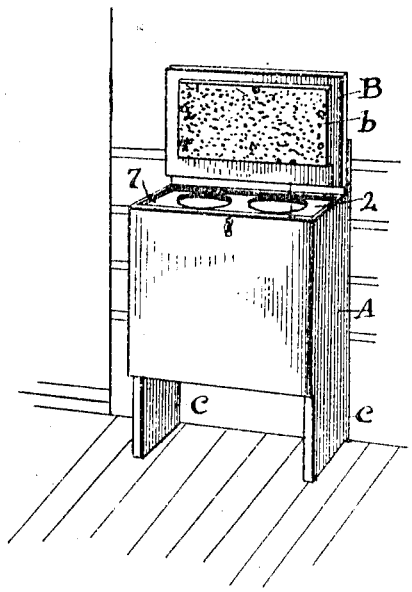
Figure 2:
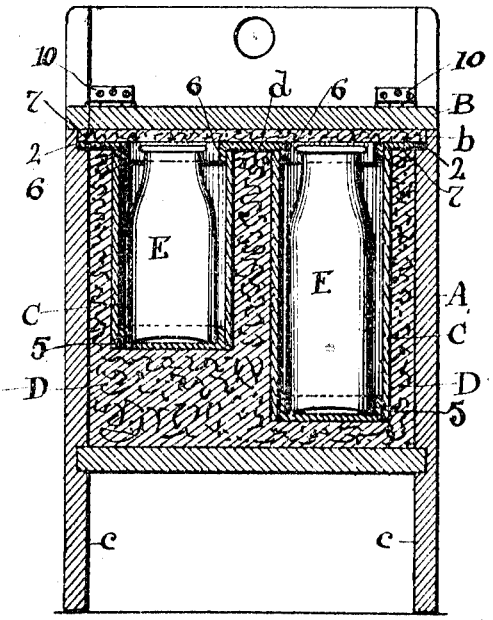

In the accompanying drawings, Figure 1 is a perspective view of the cabinet with the cover raised, and Fig. 2 is a vertical sectional elevation thereof.

The object of the invention is to provide a convenient and effective cabinet form of receptacle in which bottles of milk may be placed on their delivery at a residence and in which the milk will be kept from freezing in winter and from souring in summer when delivered cool, but of course the receptacle or cabinet is not necessarily limited to use for milk but will serve for keeping any other bottled liquid. To these ends I provide a cabinet A having walls on its four sides and bottom supports $c$ formed in this instance by extending the end boards down a suitable distance to provide legs $a$ or it may be built to hang upon a wall.

B represents a hinged cover provided with a layer of suitable nonconducting material $b$ on its inside adapted to fit within a recess about the inside of the top of the cabinet and thus make a practically air tight inclosure and exclude outside air, hot or cold.

Next within the wooden wall of the cabinet I provide a non-conducting lining D, which preferably consists of paraffined sheep's wool and extends across the bottom and up the sides all around to the said recess 2, and said lining is prepared and applied in such way that it will hold its form and place, but may be substituted by any other equally good insulating material, and is of such depth or thickness that milk delivered in the cabinet in zero or lower temperatures can be kept for hours without freezing, or in summer can be equally well protected from excessive heat. I also show a division wall $d$ of the same character as lining D and which in this instance divides the receptacle or cabinet into two bottle receiving chambers or spaces and there may be one or more of these chambers, say three or four, the idea being to afford a domestic cabinet for families using from a quart to a gallon of milk per day. The said chambers or spaces for the bottles E being built up with walls of the wool in such manner that they will stand and hold their form I can use a paraffined jacket or tube C which fits within said chambered space for the bottle and is of a size otherwise to insert the bottle therein and leave room about its side so as to freely remove the bottle therefrom. The said tube is open at both ends and is preferably made of straw-board so as to be flexible and cheap, and is paraffined, like the wool D to render the cabinet strictly sanitary. It is further planned to have the said tube renewable whenever healthful conditions or regard for cleanliness requires such change. The said tubes are engaged within their upper ends by the down flanges 6 on the inside sheet metal lid or plate 7 in the top of the cabinet over the wool D and fitting removably therein about its edges. Tin or galvanized iron will do for this purpose. Finally, I place a rather shallow cup 5 within the lower end of tube C adapted to receive any possible drippings off the bottle especially and adapted to serve as a rest or receptacle for the bottle. Said cup also is a separate part, which may be of glass or metal.

By means of a cabinet of this kind the milk is not only kept cool in summer and warm in winter but it is also protected from cats and dogs which prowl about porches and it may be locked to exclude thieves. Furthermore, such a cabinet is highly desirable both on account of its sanitary character and because it preserves the milk and keeps it both from freezing and souring by reason of prolonged exposure to otherwise unfavorable conditions and such as are of common experience by reason of milk being delivered early in most places and allowed to stand outside for an indefinite period. Hinges 10 support the cover from the front of the raised back of the cabinet.

What I claim is:

As a new article of manufacture and sale, a milk cabinet having a recess in its top and a cover provided with non-conducting material on its inside fitting in said recess, in combination with one or more tubes consisting of an absorbent material treated with paraffin and packed about the sides and bottom thereof with a paraffined fibrous material, a removable drip cup at the bottom of each tube and a removable sheet metal plate seated in said recess in the top of the cabinet and having circular down flanges with which the ends of the said tubes are in sleeved relation.

In testimony whereof I affix my signature in presence of two witnesses.

PETER W. HEBEBRAND.

Witnesses:
E. M. FISHER,
F. C. MUSSUN.